United States Patent
Licht et al.

(10) Patent No.: US 11,834,749 B2
(45) Date of Patent: Dec. 5, 2023

(54) SUSTAINABLE, FACILE SEPARATION OF THE MOLTEN CARBONATE ELECTROLYSIS CATHODE PRODUCT

(71) Applicant: C2CNT LLC, Venice, FL (US)

(72) Inventors: Stuart Licht, Venice, FL (US); Gad Licht, Venice, FL (US)

(73) Assignee: C2CNT LLC, Venice, FL (US)

( * ) Notice: Subject to any disclaimer, the term of this patent is extended or adjusted under 35 U.S.C. 154(b) by 0 days.

(21) Appl. No.: 17/330,101

(22) Filed: May 25, 2021

(65) Prior Publication Data

US 2021/0277528 A1 Sep. 9, 2021

Related U.S. Application Data

(63) Continuation of application No. 17/017,466, filed on Sep. 10, 2020, now Pat. No. 11,028,493, which is a
(Continued)

(51) Int. Cl.
*C25B 15/08* (2006.01)
*C25B 1/00* (2021.01)
(Continued)

(52) U.S. Cl.
CPC ............. *C25B 15/08* (2013.01); *B01D 29/92* (2013.01); *B01D 35/02* (2013.01); *B30B 9/06* (2013.01); *C01B 32/15* (2017.08); *C25B 1/00* (2013.01); *C25B 1/135* (2021.01); *C25B 15/083* (2021.01); *B01D 2201/202* (2013.01); *B01D 2201/30* (2013.01); *B01D 2239/1216* (2013.01); *C01B 32/154* (2017.08); *C01B 32/156* (2017.08)

(58) Field of Classification Search
CPC .......... B01D 2201/202; B01D 2201/30; B01D 2239/1216; B01D 9/06; B01D 29/92; B01D 35/02; C25B 1/135; C25B 15/083; C25B 15/08

See application file for complete search history.

(56) References Cited

U.S. PATENT DOCUMENTS

| | | |
|---|---|---|
| 1,535,577 A | 4/1925 | Cleave |
| 2,943,032 A | 6/1960 | Benner |
| | (Continued) | |

FOREIGN PATENT DOCUMENTS

| | | |
|---|---|---|
| CA | 2276444 A1 | 7/1998 |
| WO | WO-2018/093942 A1 | 5/2018 |
| WO | 2021053468 A1 | 3/2021 |

OTHER PUBLICATIONS

X. Gui, et al., "Carbon Nanotube Sponges", Materials Views, www.materialsviews.com; Advanced Materials, vol. 22, 2010, pp. 617-621.
(Continued)

*Primary Examiner* — Harry D Wilkins, III
(74) *Attorney, Agent, or Firm* — Blank Rome LLP

(57) ABSTRACT

A process for the separation of electrolyte from the carbon in a solid carbon/electrolyte cathode product formed at the cathode during molten carbonate electrolysis. The processes allows for easy separation of the solid carbon product from the electrolyte without any observed detrimental effect on the structure and/or stability of the resulting solid carbon nanomaterial.

23 Claims, 10 Drawing Sheets

Related U.S. Application Data continuation of application No. 16/667,387, filed on Oct. 29, 2019, now Pat. No. 11,346,013.

(60) Provisional application No. 62/752,141, filed on Oct. 29, 2018.

(51) Int. Cl.

| | | |
|---|---|---|
| *B01D 35/02* | (2006.01) | |
| *B01D 29/92* | (2006.01) | |
| *B30B 9/06* | (2006.01) | |
| *C25B 1/135* | (2021.01) | |
| *C01B 32/15* | (2017.01) | |
| *C01B 32/156* | (2017.01) | |
| *C01B 32/154* | (2017.01) | |

(56) References Cited

U.S. PATENT DOCUMENTS

| | | | |
|---|---|---|---|
| 3,002,898 A | 10/1961 | Jarvis | |
| 4,212,736 A * | 7/1980 | Dunkley | B01D 21/0012 75/371 |
| 4,214,519 A | 7/1980 | Stollenwerk et al. | |
| 4,421,645 A | 12/1983 | Creps et al. | |
| 4,897,110 A | 1/1990 | Kock et al. | |
| 5,419,250 A | 5/1995 | Ferguson | |
| 5,626,751 A | 5/1997 | Kikuchi et al. | |
| 7,831,735 B1 | 11/2010 | Kabra et al. | |
| 10,689,769 B2 * | 6/2020 | Clarke | B21K 23/00 |
| 11,028,493 B2 | 6/2021 | Licht et al. | |
| 11,346,013 B2 | 5/2022 | Licht et al. | |
| 2013/0161199 A1 | 6/2013 | Li | |
| 2013/0220946 A1 | 8/2013 | Klunder | |
| 2013/0254484 A1 | 9/2013 | Garg et al. | |
| 2014/0202874 A1 | 7/2014 | Elgammal | |
| 2015/0264153 A1 | 9/2015 | Anand et al. | |
| 2016/0053391 A1 * | 2/2016 | Loewen | C25C 3/36 205/44 |
| 2016/0115601 A1 | 4/2016 | Dryfe et al. | |
| 2016/0168726 A1 | 6/2016 | Dryfe | |
| 2018/0044183 A1 | 2/2018 | Licht et al. | |
| 2018/0093942 A1 | 4/2018 | Dockner et al. | |
| 2018/0126408 A1 | 5/2018 | Monden et al. | |
| 2018/0127888 A1 * | 5/2018 | Clarke | H01M 4/68 |
| 2019/0039040 A1 | 2/2019 | Licht | |
| 2019/0062517 A1 | 2/2019 | Steiner et al. | |
| 2019/0093246 A1 | 3/2019 | Reid et al. | |
| 2020/0149173 A1 | 5/2020 | Licht et al. | |

OTHER PUBLICATIONS

Chia Chi Chang, et al., "A New Lower Limit for the Ultimate Breaking Strain of Carbon Nanotubes", ACS Nano, www.acsnano.org; vol. 4, No. 9, 2010, pp. 5095-5100.

Min-Feng Yu, et al., "Strength and Breaking Mechanism of Multiwalled Carbon Nanotubes Under Tensile Load", Science, www.sciencemag.org, vol. 287, Jan. 28, 2000, pp. 637-640.

H. Wu, et al., "One-Pot Synthesis of Nanostructured Carbon Materials from Carbon Dioxide Via Electrolysis in Molten Carbonate Salts", ScienceDirect, www.elsevier.com/locate/carbon, vol. 106, 2016, pp. 208-217.

K. H. Kim, et al., "Graphene-Coated Carbon Nanotube Aerogels Remain Superelastic While Resting Fatigue and Creep Over -100 to -500° C.", Chemistry of Materials, vol. 29, 2017, pp. 2748-2755.

Zhen-Yu Wu, et al., "Carbon Nanofiber Aerogels for Emergent Cleanup of Oil Spillage and Chemical Leakage under Harsh Conditions", Scientific Reports, www.nature.com/scientificreports, vol. 4, 4079, 2014, pp. 1-6.

M. Johnson, et al., "Carbon Nanotube Wools Made Directly from $CO_2$ by Molten Electrolysis: Value Driven Pathways to Carbon Dioxide Greenhouse Gas Mitigation", Materials Today Energy, www.journals.elsevier.com/materials-today-energy, vol. 5, 2017, pp. 230-236.

J. Ren, et al., "One-Pot Synthesis of Carbon Nanofibers from CO2", Nano Letters, pubs.acs.org/NanoLett, vol. 15, 2015, pp. 6142-6148.

J. Ren, et al., "Tracking Airborne $CO_2$ Mitigation and Low Cost Transformation into Valuable Carbon Nanotubes", Scientific Reports, www.nature.com/scientificreports, vol. 6, 27760, 2016, pp. 1-10.

X. Wang, et al., "Exploration of Alkali Cation Variation on the Synthesis of Carbon Nanotubes by Electrolysis of CO2 in Molten Carbonates", Journal of CO2 Utilization, www.elsevier.com/locate/jcou, vol. 34, 2019, pp. 303-312.

X. Liu, et al., "Carbon Nano-Onions Made Directly from $CO_2$ by Molten Electrolysis for Greenhouse Gas Mitigation", Advanced Sustainable Systems, www.advsustainsys.com; 2019, pp. 10 pgs.

International Search Report and Written Opinion for PCT/US19/58585, dated Jan. 27, 2020, 10 pages.

ISR and Written Opinion issued in PCT/US20/44705 dated Oct. 23, 2020.

Wang Xi Rui et al: "Green and scalable separation and purification of carbon materials in molten salt by efficient high-temperature press filtration", Separation and Purification Technology, Elsevier Science, Amsterdam, NL, vol. 255, Sep. 12, 2020 (Sep. 12, 2020), XP086320537, ISSN: 1383-5866, DOI: 10.1016/J.SEPPUR.2020.117719 [retrieved on Sep. 12, 2020].

Extended European Search Report issued in EP19880020.3 dated Sep. 9, 2022.

Dey, Gangotri, et al., How does amalgamated Ni cathode affect Carbon Nanotube growth? A Density Functional Theory Study, RCA Advanced Accepted Manuscript, 2013, 8 pages.

Johnson, M, et al., Data on SEM, TEM and Raman Spectra of doped, and wool carbon nanotubes made directly from CO2 by molten electrolysis, Data in Brief 14, 2017, 592-606.

Lau, Jason, et al., Thermodynamic assessment of CO2 to carbon nanofiber transformation for carbon sequestration in a combined cycle gas or a coal power plant, Energy Conversion and Management, 2016, 122:400-410.

Licht, Stuart, Co-Production of Cement and Carbon Nanotubes with a Carbon Negative Footprint, 2017, 17 pages.

Licht, Stuart, et al., Carbon Nanotubes Produced from Ambient Carbon Dioxide for Environmentally Sustainable Lithium-Ion and Sodium-Ion Battery Anodes, ACS Cent. Sci., 2016, 2:162-168.

Ren, Jiawen, et al., The Minimum Electrolytic Energy Needed to Convert Carbon Dioxide to Carbon by Electrolysis in Carbonate Melts, J. Phys. Chem., 2015, 23342-23349.

Ren, Jiawen, et al., Transformation of the Greenhouse gas CO2 by Molten Electrolysis into a wide controlled selection of carbon nanotubes, 2016, 31 pages.

* cited by examiner

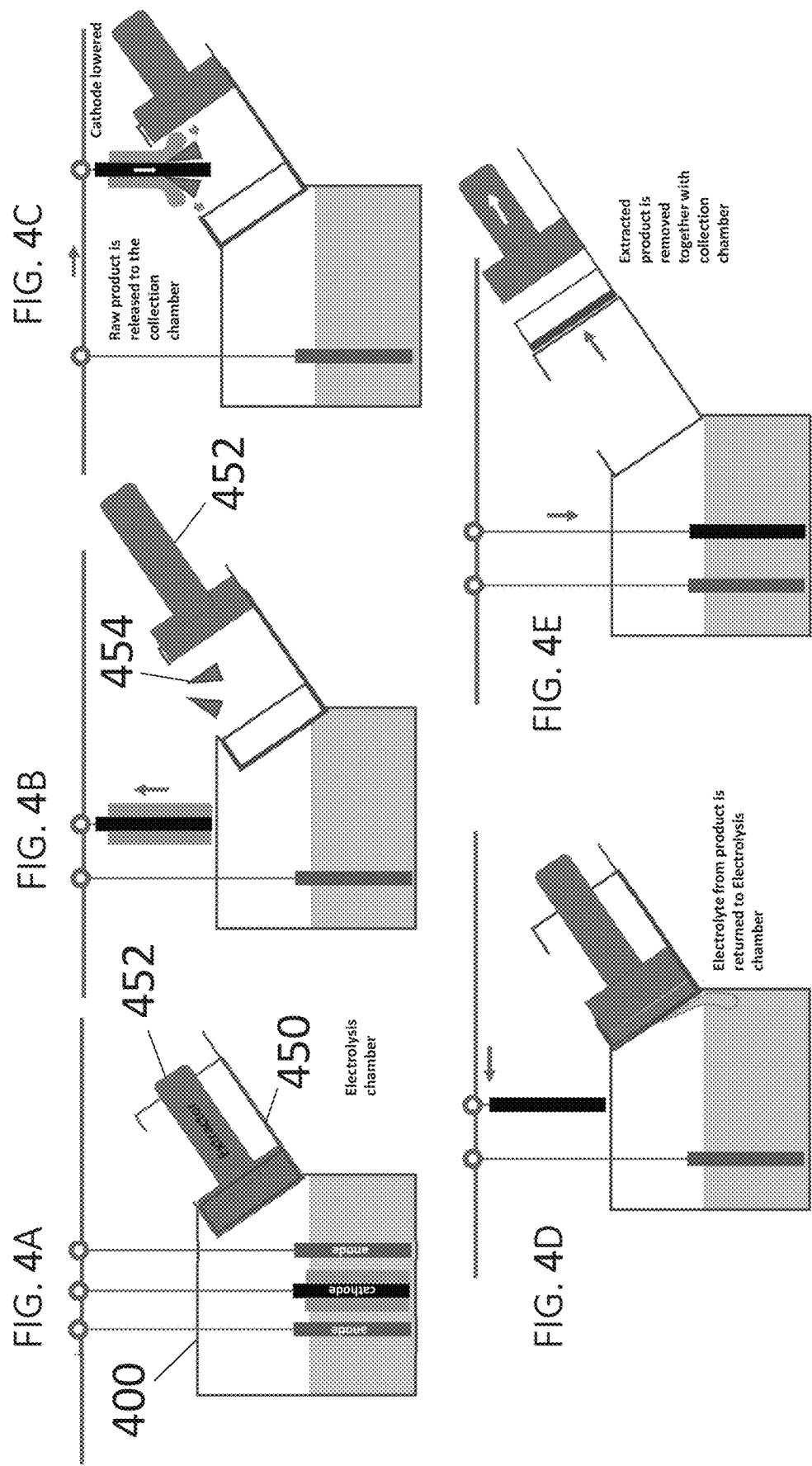

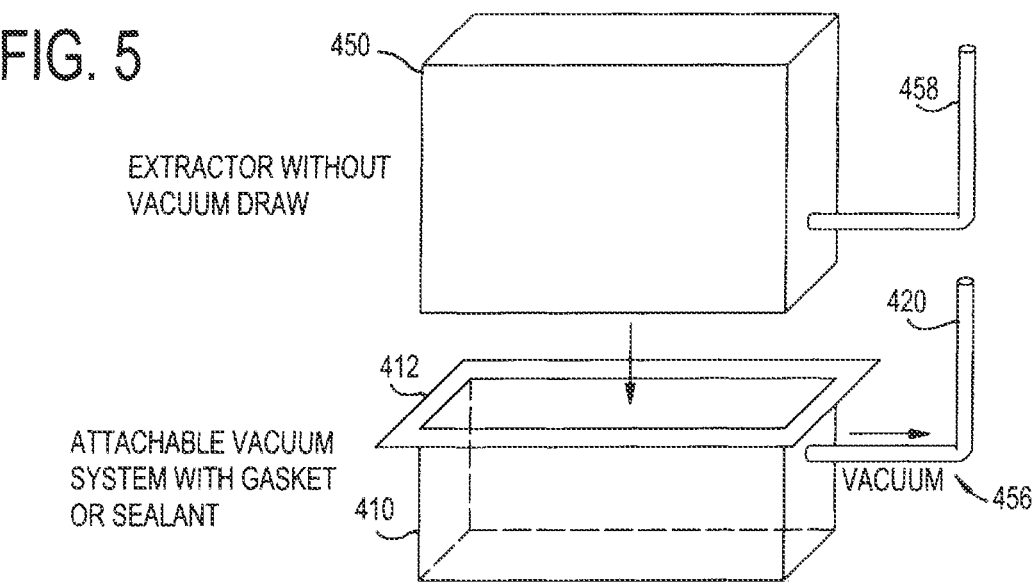

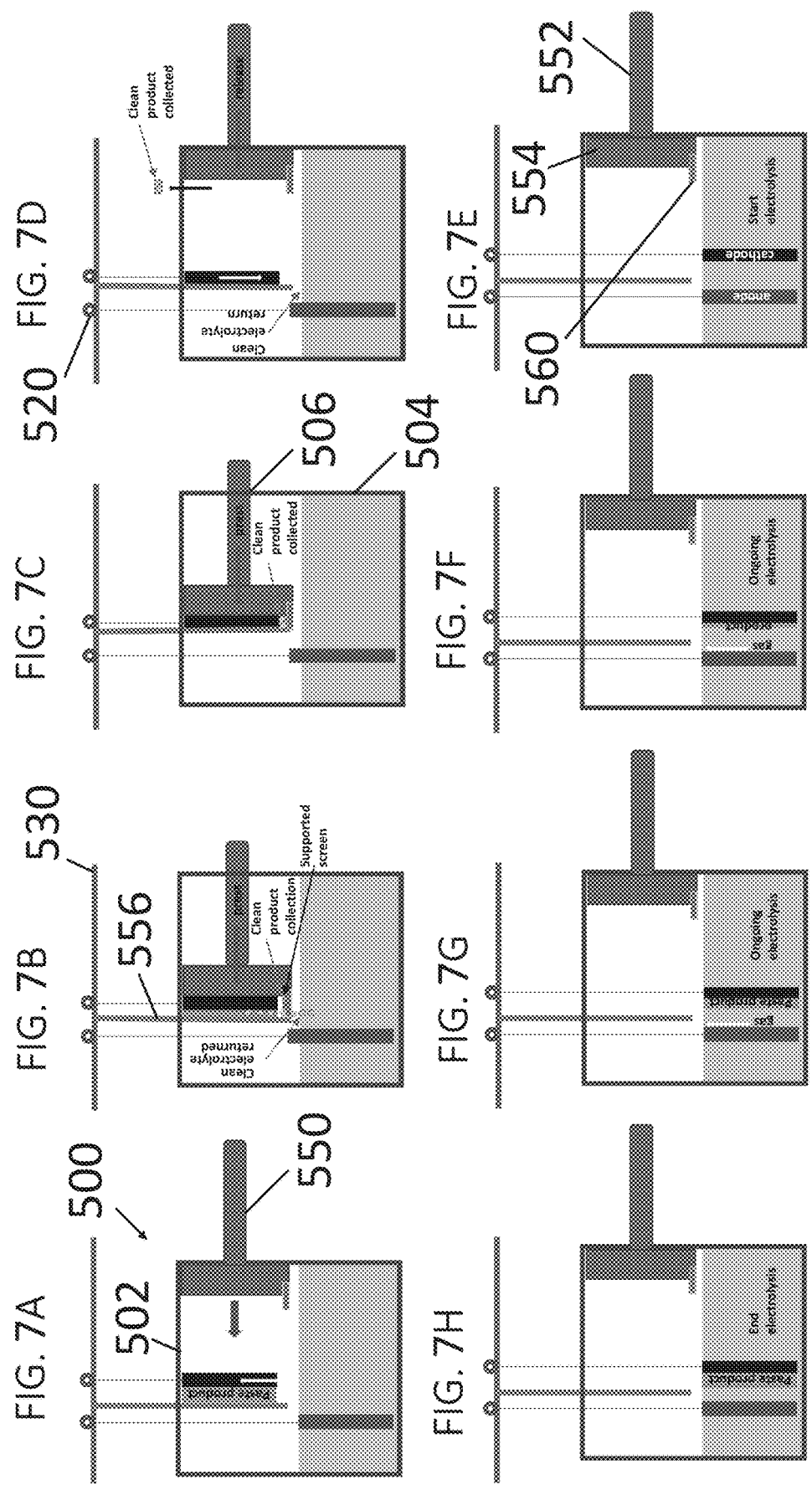

SUSTAINABLE, FACILE SEPARATION OF THE MOLTEN CARBONATE ELECTROLYSIS CATHODE PRODUCT

CROSS REFERENCE TO RELATED APPLICATIONS

This application is a continuation of U.S. application Ser. No. 17/017,466, filed Sep. 10, 2020, now U.S. patent Ser. No. 11/028,493, which is a continuation of U.S. application Ser. No. 16/667,387, filed Oct. 29, 2019, which claims the benefit of U.S. Provisional Application No. 62/752,141, filed Oct. 29, 2018. The entire content of those applications are hereby incorporated by reference.

FIELD OF THE INVENTION

The present invention relates to an improved process for the separation of electrolyte from the carbon in a solid carbon/electrolyte cathode product formed at the cathode during molten carbonate electrolysis. The processes described herein allow for easy separation of the solid carbon product from the electrolyte without any observed detrimental effect on the structure and/or stability of the resulting solid carbon product.

BACKGROUND OF THE INVENTION

One way to ameliorate the adverse consequences of rising carbon dioxide levels is by transforming carbon dioxide into a useful product. Various processes have been described to transform carbon dioxide to carbon nanomaterials, such as carbon nanotubes, carbon nanofibers, carbon nano-onions, carbon scaffolds, carbon platelets, and graphene, by molten carbonate electrolysis (see, e.g., citations 1-6 listed herein). For example, carbon nanotubes may be formed by electrolysis in molten lithium carbonate (melting point 723° C.) or in related mixes including alkali or alkali earth carbonates, with or without oxides, borates, phosphates, sulfates, nitrates, chlorides or other inorganic salts. During this electrolysis, the carbon nanomaterials are typically deposited on the electrolysis cathode but are bound to the cathode with an excess of electrolyte.

Some processes explored to separate the carbon from the carbonate electrolyte in the resulting product include a variety of aqueous washes or drawing the molten electrolyte through a mesh with a BNZ (calcium aluminum silicate) firebrick (see, e.g., citation 2). The aqueous washing methodologies require cooling and heat is reversibly lost from the electrolysis cell. Both the aqueous and molten firebrick extraction consumes large amounts of material, which is detrimental to sustainability of the overall carbon dioxide removal process. For example, the aqueous separations may be accomplished by the addition of copious amounts of water and additives such as ammonia sulfate, or formic or hydrochloric acid to facilitate dissolution of the carbonate into the aqueous phase for separation from the solid carbon product. For the (molten) solid carbon/electrolyte product the firebrick acts to draw the molten carbon electrolyte by chemical reaction with the aluminate or silicate component of the firebrick. These firebrick components are consumed during the separation, such as without being bound by any theory or specific equation, the reaction of lithium carbonate consuming firebrick materials exemplified by the consumption of alumina, and silicon dioxide respectively to lithium aluminate and lithium ortho or meta silicate:

$$Li_2CO_3 + Al_2O_3 \rightarrow 2LiAlO_2 + CO_2\text{(gas evolved)} \quad (1)$$

$$2Li_2CO_3 + SiO_2 \rightarrow Li_4SiO_4 + 2CO_2\text{(gas evolved)} \quad (2a)$$

$$Li_2CO_3 + SiO_2 \rightarrow Li_2SiO_3 + CO_2\text{(gas evolved)} \quad (2b)$$

Carbon nanotubes are flexible and have the highest tensile strength of any material measured to date (see, e.g., citations 7 and 8 listed herein). Recently, it has been observed that the carbon product of molten carbonate electrolysis can consist of a matrix of intermingled carbon nanotubes (see, e.g., citation 2 listed herein).

There is therefore a need for new and efficient processes to separate electrolyte from the solid carbon nanomaterial formed at the cathode during electrolysis, thereby providing a more sustainable (e.g., preventing heat and electrolyte waste), more cost-effective process and providing a cleaner, more useful nanomaterial.

SUMMARY OF THE INVENTION

The present invention relates to an improved process for the separation of the carbon product from a solid carbon/molten electrolyte mixed product (a carbanogel) formed, e.g., on the cathode, during a carbonate electrolysis reaction.

A variety of carbon nanomaterials can be deposited on the cathode by control of the electrolysis conditions. During deposition, the carbon formed at the cathode exhibits a strong affinity for electrolyte, and the cathode product contains a mix of solid carbon and molten electrolyte. The deposited cathode product is a paste or gel at temperatures above the melting point of the electrolyte, or when the cathode is removed and allowed to cool to room temperature, the cathode product is a solid mixture of the carbon and congealed electrolyte. In either case, the cathode deposition contains a majority of electrolyte by mass compared to carbon. The solid carbon product/electrolyte mix is spontaneously formed on the cathode in real time during the electrolysis, and not after the solid carbon is formed. Solid product is not dislodged from the cathode to subsequently form a slurry with the electrolyte. The paste is black in color (and red hot) and is clearly distinguished from the clear molten electrolyte between the electrodes and in the electrolysis chamber. The product is a thick paste layer on the cathode which grows as the electrolysis continues. Depending on the electrolysis conditions, the percentage of electrolyte in the paste which contains the cathode product ranges from 70 to 97 percent by weight and is typically in the range from 90 to 97 percent by weight.

The present inventor has surprisingly found that the solid carbon product can be separated from a solid carbon/molten electrolyte mixed product (carbanogel) by a compression process, and that carbanogels formed on the cathode during a molten carbon carbonate electrolysis reaction can be repeatedly compressed without any observed detrimental effect on the structure and/or stability of the resulting solid carbon nanomaterial, thereby allowing for efficient separation of the desired solid carbon product.

Typically, individual carbon nanomaterials have a diameter of less than 500 nm. The present inventor has also surprisingly found that carbon nanotubes comprising a matrix of highly porous, intermingled carbon nanotubes that are greater than, for example, 500 nm height, can be repeatedly compressed to a small fraction of their initial volume without damage the structure of the carbon nano-materials (see, e.g., citations 9-11 listed herein).

Typically, the desired carbon product develops as a thick paste on the cathode (it is not released into the free, circulating electrolyte) during the electrolysis reaction. The paste comprises solid carbon product and bound electrolyte. In the processes described herein, the paste containing solid carbon product is separated from the bound electrolyte. The electrolyte in the paste is stationary and is separate from the free electrolyte situated in the electrolysis chamber.

In one aspect, the present invention relates to a process for preparing a solid carbon product. In one embodiment, the process comprises separating electrolyte from a solid carbon/molten electrolyte mixed product (a "carbanogel") formed during a carbonate electrolysis. In one embodiment, the process comprises:

(i) applying a force to a solid carbon/molten electrolyte mixed product to remove the electrolyte;
(ii) removing the force; and
(iii) optionally, isolating the solid carbon product.

In one embodiment of any of the processes described herein, steps (i) and (ii) are repeated one or more times, such as two, three or four times, prior to step (iii).

In certain embodiments of any of the processes described herein, the force (compression) is applied manually, pneumatically or hydraulically.

In certain embodiments of any of the processes described herein, the force (compression) is conducted at a pressure of between about 10 psi and about 100,000 psi, such as between about 50 psi and about 50,000 psi, or between at about 100 psi and about 1,000 psi.

In certain embodiments of any of the processes described herein, the electrolyte is removed through an interface with pores, such as, for example, a filter, a porous carbon felt, a graphite felt, a metal mesh, a porous or sieve ceramic, or any combination thereof.

In one embodiment, the pore size of the interface is smaller than the solid carbon matrix product size. For example, the pore size of the interface may be between about 10 μm and about 10 mm, such as between about 50 μm and about 5 mm or between about 70 μm and about 3 mm.

In one embodiment of any of the processes described herein, the process in conducted in vacuo (i.e., by applying a vacuum during the separation/extraction process). In one embodiment, the vacuum enhances removal of the electrolyte and separation of the solid carbon product.

In one embodiment of any of the processes described herein, the vacuum applied is between about 0.1 and about 0.9 atmospheres.

In another embodiment of any of the processes described herein, the vacuum applied is greater than about 0.8 atmospheres, or greater than about 0.9 atmospheres, such as between about 0.8 and about 0.999 atmospheres, or between about 0.9 and about 0.99 atmospheres.

In another embodiment of any of the processes described herein, the process is conducted at a pressure between about 0.1 and about 0.9 atmospheres, such as between about 0.2 and about 0.9 atmospheres.

In another embodiment of any of the processes described herein, the process is conducted at a pressure less than about 0.1 atmospheres, such as less than about 0.01 atmospheres.

In one embodiment of any of the processes described herein, the vacuum applied is between about 0.01 MPa and about 0.1 MPa, such as between about 0.05 MPa and about 0.1 MPa, such as about 0.09 MPa.

In another embodiment of any of the processes described herein, the process is conducted in the absence of oxygen, for example, under a blanket of gas that is free or substantially free of oxygen (an oxygen excluding gas). For example, in one embodiment, the oxygen excluding gas blankets the mixed product to protect the solid carbon product from oxidation.

In certain embodiments, the oxygen excluding gas is an inert non-oxidizing gas, such as, for example, nitrogen, carbon dioxide, argon, or a reducing gas, such as, for example, methane, ammonia, hydrogen and hydrogen sulfide, and any combination of any of the foregoing.

In another embodiment of any of the processes described herein, the process is conducted at a temperature between about 399° C. and about 900° C., such as between about 700° C. and about 900° C. In another embodiment of any of the processes described herein, the process is conducted at a temperature of about 399° C., about 723° C. or about 891° C., which correspond, respectively, to the melting points of eutectic lithium sodium potassium carbonate, lithium carbonate, and pure potassium carbonate.

In another embodiment of any of the processes described herein, the mixed product is cooled to below the point of solidification, such as below 700° C., after its formation by electrolysis and then reheated/melted prior to the one or more compression step(s) in the processes described herein.

In other embodiments of any of the processes described herein, the solid carbon/molten electrolyte mixed product is compressed directly on the cathode in the electrolysis chamber.

In one embodiment of any of the processes described herein, the solid carbon/molten electrolyte mixed product is removed from the cathode.

In another embodiment of any of the processes described herein, the solid carbon/molten electrolyte mixed product is removed from the cathode in the electrolysis chamber, e.g. without pumping, into a separate extraction compression chamber prior to separation of the solid product.

In another embodiment of any of the processes described herein, the process does not involve a flowing electrolyte.

In another embodiment of any of the processes described herein, the process does not involve a recirculation loop.

In another embodiment of any of the processes described herein, the resulting solid carbon product has an average thickness greater than 10 μm, such as greater than 0.3 mm, greater than 1 mm or greater than 3 mm.

In another embodiment, of any of the processes described herein, the resulting solid carbon product comprises greater than about 80% carbon nano-materials, such as greater than about 85%, greater than about 90% or greater than about 95% carbon nano-materials. In a preferred embodiment, the carbon nano-materials are carbon nanotubes, carbon nano-onions, carbon nano-platelets, carbon nano-scaffolds, graphene or any combination thereof.

In another embodiment, of any of the processes described herein, a morphological template is not present on the cathode during formation and/or separation (compression) of the solid carbon/molten electrolyte mixed product.

In another aspect, the present invention relates to a chamber useful for conducting any of the process described herein.

In one embodiment, the present invention relates to an extraction chamber for separating electrolyte from a solid carbon/molten electrolyte mixed product formed during a carbonate electrolysis, the extraction chamber comprising (i) a solid carbon/molten electrolyte mixed product formed during a carbonate electrolysis;

(ii) a compression device compressing the solid carbon/molten electrolyte mixed product;

(iii) a removal device configured to remove the compression;

(iv) an interface with pores through which electrolyte separated from the mixed product during compression is collected; and (v) optionally, a vacuum applied to the extraction chamber.

In one embodiment, the extraction chamber is rectangular or circular.

In one embodiment, the extraction chamber is operated in the vertical mode.

In one embodiment, the extraction chamber is operated in the horizontal mode.

In one embodiment, the extraction chamber is operated in an angular mode.

In one embodiment, the extraction chamber is operated within a kiln.

In one embodiment, the extraction chamber is situated with an electrolysis chamber.

BRIEF DESCRIPTION OF THE DRAWINGS

FIG. 4A-4E show an exemplary extraction chamber for collecting raw material from an electrode in accordance with the processes described herein, with the extraction chamber positioned at an angle and directly interfaced to the electrolysis chamber.

FIG. 5 shows an exemplary extraction chamber for use in the processes described herein that can be operated with or without a vacuum system to separate the electrolyte in vacuo.

FIGS. 7A-7H show an exemplary product extractor situated within the electrolysis chamber and an extraction process.

DETAILED DESCRIPTION OF THE INVENTION

Figure 1A:
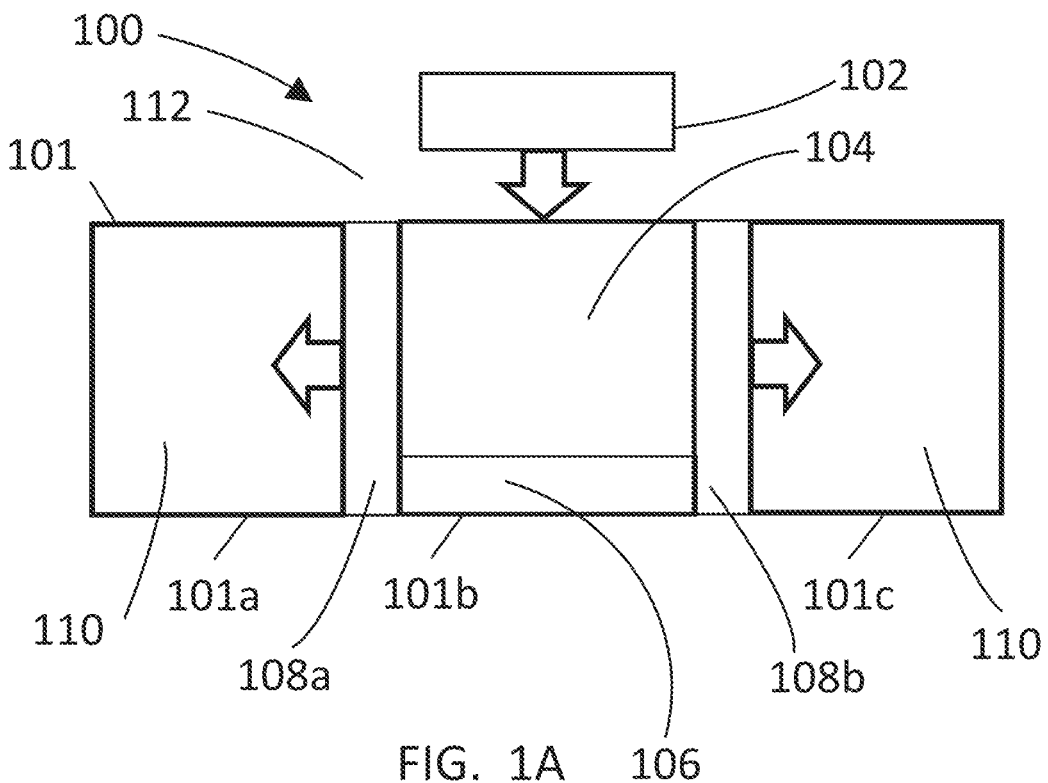
FIG. 1A is a block diagram showing separation at the cathode in an electrolysis chamber of electrolyte from the solid carbon in the solid carbon/electrolyte cathode product of a molten carbonate electrolysis reaction.

In describing the illustrative, non-limiting embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings.

U.S. Publication Nos. 2019/0039040 and 2018/0044183, which are hereby incorporated by reference in their entireties, describe the synthesis of carbon nanomaterials via electrolysis in carbonate containing molten electrolytes.

As used herein, the term "carbanogel" refers to a product analogous to an aerogel in which the air in the aerogel is replaced by molten carbonate. For example, a carbanogel contains a majority of molten carbonate with an intermingled solid matrix component. For sustainable, effective carbon dioxide splitting the electrolyte trapped in the carbanogel product of molten carbonate electrolysis needs to be separated to be available for continued use in the electrolysis.

As used herein, a gas that is "substantially free of oxygen" means a gas than contains less that about 1000 ppm of oxygen, such as less than about 500 ppm, less than about 400 ppm, less than about 300 ppm, less than about 200 ppm, less than about 100 ppm, less than about 50 ppm, less than about 25 ppm, less than about 10 ppm, less than about 5 ppm, or less than about 1 ppm, of oxygen.

FIG. 1A is a diagram of an exemplary extraction system 100 that separates electrolyte from solid carbon in the solid carbon/electrolyte product formed at the cathode during a molten carbonate electrolysis reaction. The system 100 includes a force applicator 102, a solid carbon/electrolyte product 104, a cathode 106, a filter or interface with pores 108, and an electrolyte 110 pressed out of the solid carbon/electrolyte product. Although the interface with pores 108 is shown on the side of the solid carbon electrolyte product 104 in one embodiment of FIG. 1A, it is to be understood that the interface with pores 108 alternatively can be an integral part of the cathode, if the cathode comprises a porous material, in which case the pressed electrolyte 110 is then pushed through and out the backside of the cathode 106.

More specifically, the system 100 can be a chamber, such as an extraction chamber. The chamber 100 can be formed as a single unitary housing or container 101 having an interior. As shown, the container 101 can be elongated with a bottom, two transverse sides or walls and two longitudinal sides or walls that have a substantially rectangular cross section and define a central longitudinal axis (extending along a length of the container 101), though any suitable shape and size can be utilized. The top of the container 101 is open, though a cover with holes can optionally be placed over at least two side sections 101a, 101c of the container 101. The transverse walls extend substantially orthogonal to the longitudinal axis and the longitudinal sides extend substantially parallel to the longitudinal axis.

One or more dividing panels or separators, such as filters, membranes or interfaces are received in the interior of the container 101. Here, a first interface 108a has a first side and a second side opposite the first side. The first side of the first interface 108a faces one transverse side of the container 101 to define a first section 101a of the interior of the container 101 between the first side of the first interface 108a and the transverse side of the container 101. A second interface 108b has a first side and a second side opposite the first side. The first side of the second interface 108b faces the second side of the first interface 108a to define a second section 101b of the interior of the container 101 between the first side of the second interface 108*b* and the second side of the first interface 108*a*. The second side of the second interface 108*b* faces the other transverse side of the container 101 to define a third section 101*c* of the interior of the container 101 between the second side of the second interface 108*b* and the other transverse side of the container 101. The center section 101*b* forms an extraction chamber or container, and the two side sections 101*a*, 101*c* each form a collection chamber or container.

As shown, each section 101*a*, 101*b*, 101*c* can have a substantially square cross section, though any suitable shape and size can be utilized. The interfaces 108 are relatively thin and can form a plate (or two plates with filter material therebetween) with two opposite sides that are relatively flat and planar and can have multiple holes that allow material to pass from the center section 101*b* to one of the two outer sections 101*a*, 101*c* through the interface 108. The interfaces 108 extend substantially transverse to the longitudinal axis of the container across the entire width and height, and parallel to the transverse sides of the container 101, so that material in the center section 101*b* cannot pass to the outer sections 101*a*, 101*c*, except through one of the two interfaces 108*a*, 108*b*. The interfaces 108*a*, 108*b* can be any suitable device that separates material. Each section 101*a*, 101*b*, 101*c* has a respective interior space of the interior of the container 101.

The middle or center section 101*b* of the container 101 receives the force applicator 102, the cathode 106, and the material 104, such as a carbon/electrolyte product. The force applicator 102 is sized and shaped to the center section 101*b*, here shown as a compressor formed by a flat square or rectangular plate that extends the entire space between the two interfaces 108*a*, 108*b* and the two longitudinal sides of the container 101. The cathode 106 can also be a flat square or rectangular plate that extends the entire space between the two interfaces 108*a*, 108*b* and the two longitudinal sides of the container 101. The cathode 106 can be situated, for example at the bottom of the interior space of the center section 101*b*.

As illustrated by the large arrows in FIG. 1A, the cathode 106 and material 104 is placed in the center section 101*b*. The compressor 102 is located above the center section 101*b* and is forced downward into the center section 101*b*, such as by pneumatic operation. As the compressor 102 moves downward, it forces product 104 to separate. The first interface 108*a* can have a first filter mechanism (e.g., first porous material) that filters a first product (i.e., gas, liquid or material), and the second interface 108*b* can have a second filter mechanism (e.g., second porous material) that filters a second product (e.g., gas, liquid or material) which is the same or different from the first product. Here, both the first and second interfaces 108*a*, 108*b* filter carbon so that only an electrolyte 110 can pass through the interfaces 108*a*, 108*b* into the first and second sections 101*a*, 101*c*, respectively. As noted, the compressor 102 is sized and shaped to match the size and shape of the center section 101*b* so that material 104 doesn't escape around the sides of the compressor 102 as it compresses downward, but instead the material 104 presses through the interfaces 108*a*, 108*b*.

In a further embodiment, an oxygen excluding gas (e.g., a gas that is free or substantially free of oxygen) 112 may optionally be used to blanket (e.g., completely cover) the system 100, for example, to prevent oxidation of the solid carbon during electrolyte separation from the solid carbon/electrolyte product 104. In this embodiment, the system 100 can include a main housing that encloses the compressor 102 and the container 101, such as shown for example in FIGS. 2A-2C (see, e.g., main housing 201). The gas 112 can be pumped into the main housing around the container 101 to contact the product 104 and/or electrolyte 110 in any of the sections 101*a*, 101*b*, 101*c*.

The chamber 100 of FIG. 1A has sections 101*a*, 101*b*, 101*c* arranged in a side-by-side relationship, and with electrolyte being filtered into the two outer sections 101*a*, 101*c*. However, the sections 101 can be arranged in any suitable manner, and only a single section (or compartment) is needed to hold the product 104 and another section (or compartment or container) is needed to receive the filtered electrolyte 110.

Figure 1B:
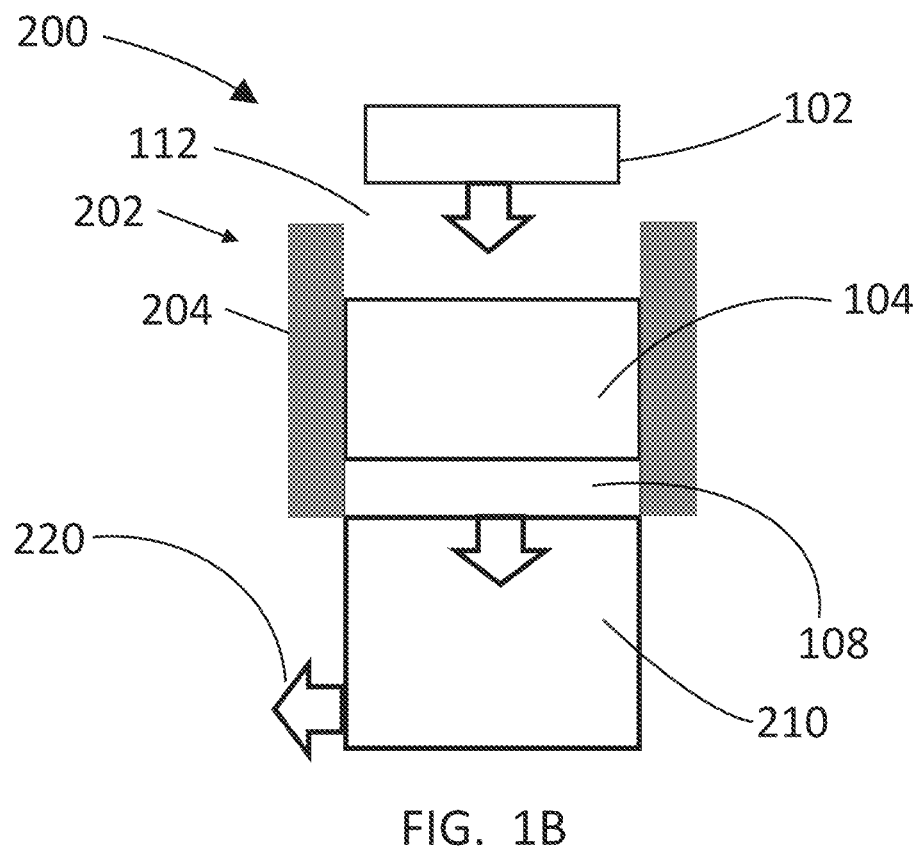
FIG. 1B is a block diagram showing separation in an extraction chamber (not at the cathode in an electrolysis chamber) of electrolyte from the solid carbon in the solid carbon/electrolyte cathode product of a molten carbonate electrolysis reaction.

FIG. 1B is a diagram of an exemplary system 200 that separates electrolyte from solid carbon in a solid carbon/electrolyte product in an extraction chamber. Using similar components as labeled in FIG. 1A, the solid carbon/electrolyte product 104 is first removed from the cathode of the electrolysis chamber (not shown) and placed as a gel (hot) or initially solid (frozen gel, then reheated to a molten gel) into the electrolyte pressing extraction reservoir or chamber 210. As a further embodiment, an optional vacuum 220 can be applied to the pressing chamber to provide a pull of electrolyte through the interface with pores 108.

More specifically, the extraction chamber 200 has a housing 202 with four sides or walls 204 forming a container with an interior space and a square or rectangular cross section. The housing 202 has an open top and an open bottom. The interface 108 is provided at the bottom of the housing 202 and closes the open bottom of the housing 202. Product 104 is placed in the interior of the housing 202. The lower container or extraction chamber 210 is located beneath the housing 202 and interface 108. The compressor 102 is sized and shaped to match the size and shape of the interior of the housing 202, and pushes downward on the product 104, forcing electrolyte through the interface 108 and into the extraction reservoir, such as a square or rectangular chamber 210. In addition, an optional vacuum 220 can be provided with or instead of the compressor 102 to further facilitate electrolyte passing through the interface 108; though it is also noted that some electrolyte may pass through the interface 108 by force of gravity without the use of a compressor 102 and/or vacuum 220. The vacuum 220 can also operate as a drain to collect separated electrolyte, or a separate drain (e.g., a hose or line) can be provided. The interface 108 prevents carbon from passing, so only electrolyte enters the extraction chamber 210. Though not shown, a cathode 106 can also be located in the housing 202.

FIGS. 2-6 show other embodiments of the invention. The system can have any suitable size or shape and be configured vertically, horizontally or at an angle. Turning to FIGS. 2A, 3D, a horizontal configuration of the extractor system 300 is shown. The system 300 has an extraction container or chamber 302, an electrolyte collection chamber 310, and a filter 308 between the container 302 and the collection chamber 310. The extraction chamber 302 has a top, bottom and at least two sides or walls, here shown as longitudinal walls extending along the length of the chamber 302. One side can be open to receive the plate of the compressor 102. In the embodiment shown, the chamber 302 is elongated and the compressor 102 is received at an open proximal transverse end of the chamber 302. The compressor 102 extends along the longitudinal axis of the chamber 302 from a proximal end of the chamber 302. Raw product 304 can enter through an opening in a side wall or the top.

The interface or filter 308 is located at the open distal transverse end of the extraction chamber 302, and the collection chamber 310 is connected to the distal transverse end of the extraction chamber 302. A heat zone 306 can be provided at a portion of the container 300, such as at a proximal portion and immediately adjacent to the interface or filter 308. The compressor 102 pushes inward from the proximal end to the distal end so that heated product passes through the filter 308 and into the electrolyte collection reservoir or chamber 310. The vacuum 320 can be connected to the electrolyte collection reservoir 310 to facilitate electrolyte passing through the filter 308 into the reservoir 310. The vacuum 320 can be coupled on a side of the reservoir 310 opposite the filter 308. The vacuum acts to both pull electrolyte from the carbon nanogel and to protect it from oxidations As shown in FIGS. 2B, 2C, 3B, the compressor 102 and container 202 can be circular, and FIGS. 2B, 2C, 3C show that the compressor 102 can engage or attach to a main housing 201. Turning to FIGS. 2D, 2E, the container 202 can have a support shelf or ledge 205 extend inwardly from one or more of the side walls 204. A steel support plate 212 can be placed on the ledge 205. The support plate 212 has a plurality of openings, such as forming a honeycomb pattern. The plate 212 can support an interface 208 that is placed on top of the plate 212, such as a filtering membrane, mesh screen, felt material or the like.

Figure 3A:
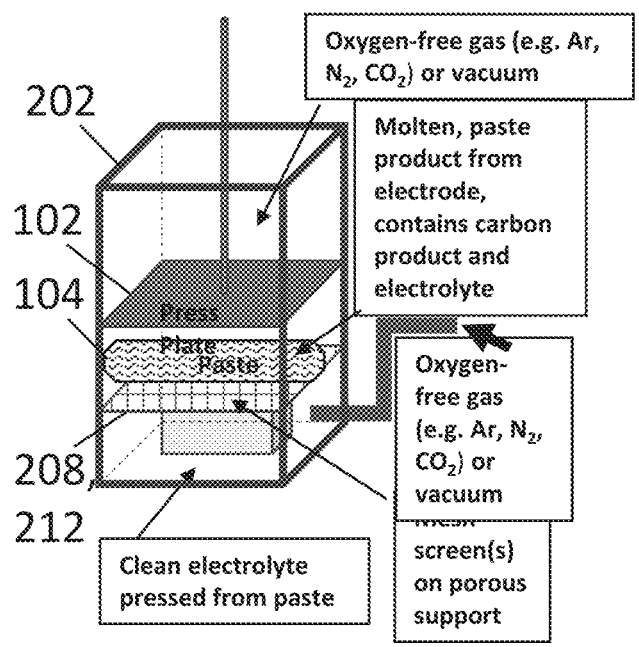
FIG. 3A shows exemplary rectangular extraction chambers for use in the processes described herein.
Figure 3B:
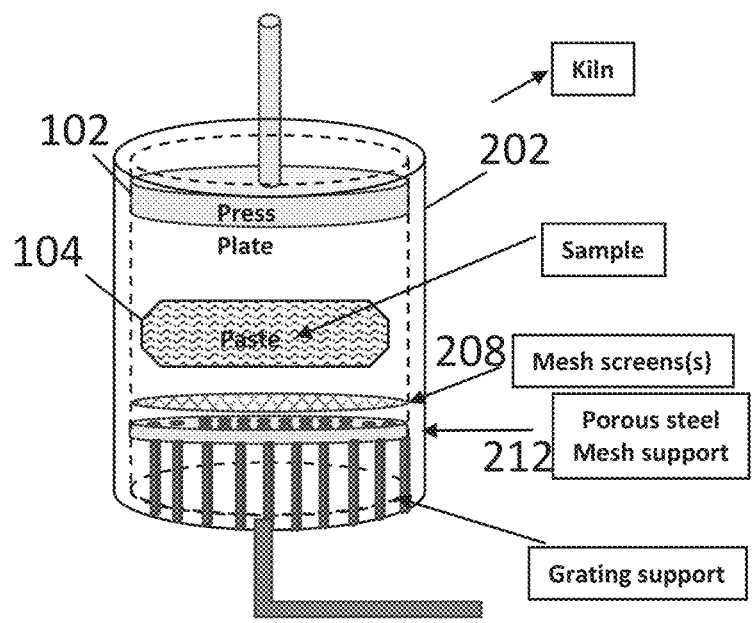
FIG. 3B shows exemplary circular extraction chambers for use in the processes described herein.
Figure 3C:
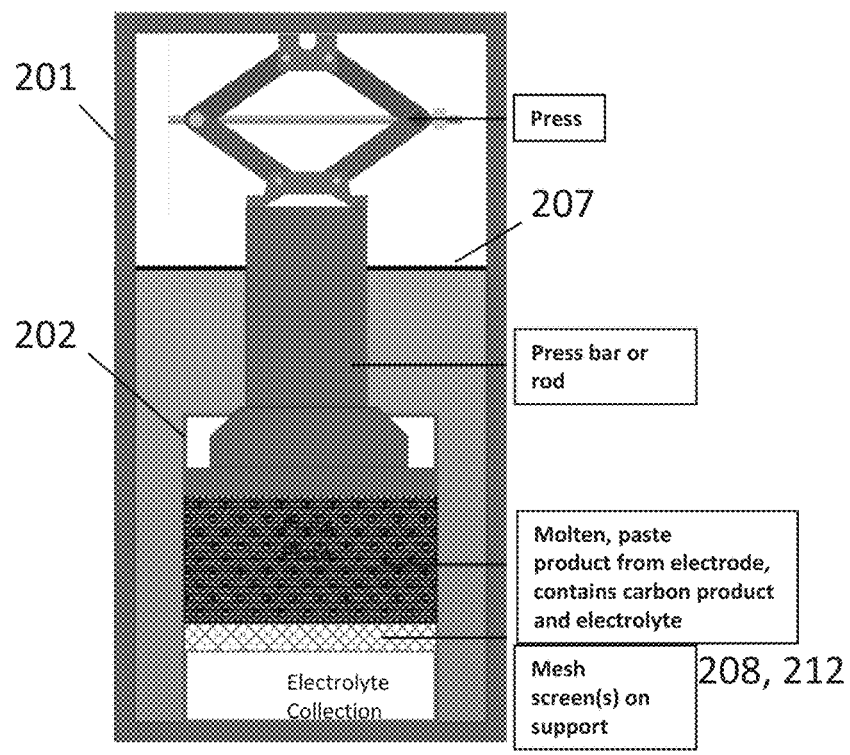
FIG. 3C shows an exemplary extraction chamber for use in the processes described herein operating in the vertical mode.
Figure 3D:
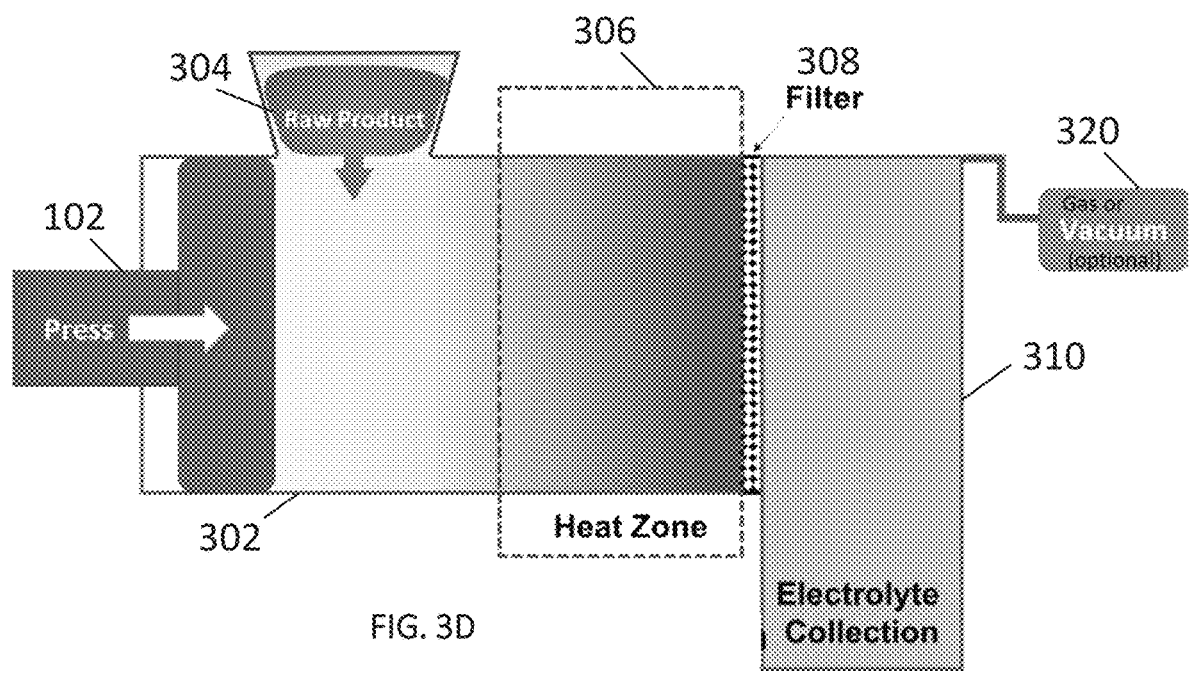
FIG. 3D shows an exemplary extraction chamber for use in the processes described herein operating in the horizontal mode.

FIG. 3A shows a chamber 202 for use with a molten paste material from an electrode that contains carbon product and electrolyte. The paste is on top of a mesh screen 208 on a porous support 212. The compressor pushes down on the paste and electrolyte passes through the mesh screen 208 into a separate container or the bottom of the chamber. The chamber 202 can be gas tight, and oxygen-free gas (e.g., Ar, $N_2$, $CO_2$) or a vacuum can be applied inside the container around the paste material.

FIG. 3B shows that instead of an internal support ledge 205, a grating support can be provided to support the porous mesh support 212. In addition, a mesh screen 208 can be provided on top of the mesh support 212, and the sample is placed on top of the mesh screen 208. A heater can be provided to heat the system, for example the system can be inside a kiln or coupled to a kiln.

FIGS. 2B, 2C show that the compressor 102 can be formed as a plate and a threaded bar. The threaded bar can extend through a threaded opening in the top plate of the main housing 201 and the threaded bar can be rotated in the opening to extend the bar and plate further into the container 202. FIG. 3C shows another embodiment in which the compressor 102 has a press plate and a scissor-type hydraulic jack mounted to the press plate. The jack presses against the top plate of the main housing 201, and a threaded bar in the jack can be rotated to extend the jack and move the press bar or rod and press plate further into the container 202. FIG. 3C also shows a molten paste product in the container 202 from the electrode. The molten paste product contains carbon product and electrolyte. The press plate forces electrolyte out of the paste product, through a mesh screen 208 positioned on a porous support 212, into a collection reservoir at the bottom of the container 202. In addition, a divider 207 is provided in the main housing 207. The divider 207 is a plate that extends across the main housing 201 and around the compressor 102, such as the rod of the compressor 102. The divider 207 forms a gas-tight seal and encloses the container 202. An oxygen-free gas can be introduced into the sealed enclosure. The gas comes into contact with the product when the paste product from the electrode is introduced prior to placement of the press plate, or during pressing through any leaks in the seal between the press plate and the paste product from the electrode.

FIGS. 4A-4E show a collection chamber 450 positioned with respect to an electrolysis chamber 400 and operating to remove product. In FIG. 4A, the electrolysis chamber 400 is shown with a cathode electrode positioned between two anode electrodes, surrounded by electrolyte. The collection chamber 450 is integrally formed with our coupled to the electrolysis chamber 400. The collection chamber 450 is above the level of the electrolyte in the electrolysis chamber 400. A transport apparatus is coupled to the cathode, such as by a wire, bar or solid rod, and configured to move the cathode from the electrolysis chamber 400 to the collection chamber 450. Here, the transport apparatus includes a conveyor device that is located above the electrolysis chamber 400 and the collection chamber 450. When carbon is attached to the cathode, one or more transport motors are operated to vertically raise the cathode out of the electrolysis chamber 400, FIG. 4B, and then move the cathode horizontally over the collection chamber 450, FIG. 4C. The compressor 452 is withdrawn from the collection chamber 450, and the cathode is lowered by the transport apparatus into an opening in the collection chamber 450.

Raw product is then released from the cathode into the collection chamber. For example, the collection chamber 450 can have one or more scraper blades 454 positioned in the opening of the collection chamber 450. A scraper channel or opening is formed between the one or more blades 454. The cathode is lowered into the scraper channel between the scraper blades 454, which forces the raw product off of the cathode and into the collection chamber 450. The compressor then extends into the collection chamber and compresses the raw product. Electrolyte from the product passes through the interface of the collection chamber and returns directly into the electrolysis chamber, while carbon remains in the collection chamber. The extracted carbon product is removed together with the collection chamber. It is further noted that any of the systems of FIGS. 1-3, 5-7 can be utilized for the collection chamber 450 of FIGS. 4A-4E. in addition, while the collection chamber 450 is shown at an angle with respect to the electrolysis chamber 400, the collection chamber 450 can be positioned vertically or horizontally with respect to the electrolysis chamber 400.

FIG. 5 shows a product extractor or collection chamber 450 and vacuum system 456 in a vertical arrangement. A vacuum system 456 can optionally be attached to the collection chamber 450. The collection chamber 450 can be a container with walls, here shown as a cube with rectangular or square sides and an open bottom. The vacuum system 456 includes an extraction chamber 410, gasket or sealant 412, and vacuum line 420. The extraction chamber 410 can be a container or reservoir that retains electrolyte that is drawn out of the extractor 450. The extraction chamber 410 is shown as a cube with square or rectangular sides and an open top. The seal 412 is provided at the top edge of the extraction chamber 410 and bottom edge of the collection chamber 450 to form an air-tight seal between the collection chamber 450 and the extraction chamber 410. The vacuum line 420 is coupled to the extraction chamber 410 and in gas communication therewith. Once the seal is formed, the vacuum line 420 can create a vacuum or negative pressure in the extraction chamber 410, that in turn pulls electrolyte out of the product contained in the collection chamber 450. The extraction chamber 410 can then be removed, the electrolyte emptied, and the extraction chamber replaced. The vacuum system 456 shown in FIG. 5 can be utilized with any of the systems 100, 200, 300 of FIGS. 1-4. The drain tube or pipe 458 drains accumulation of excess electrolyte that has been separated from the paste product from the electrode.

Figure 6A:
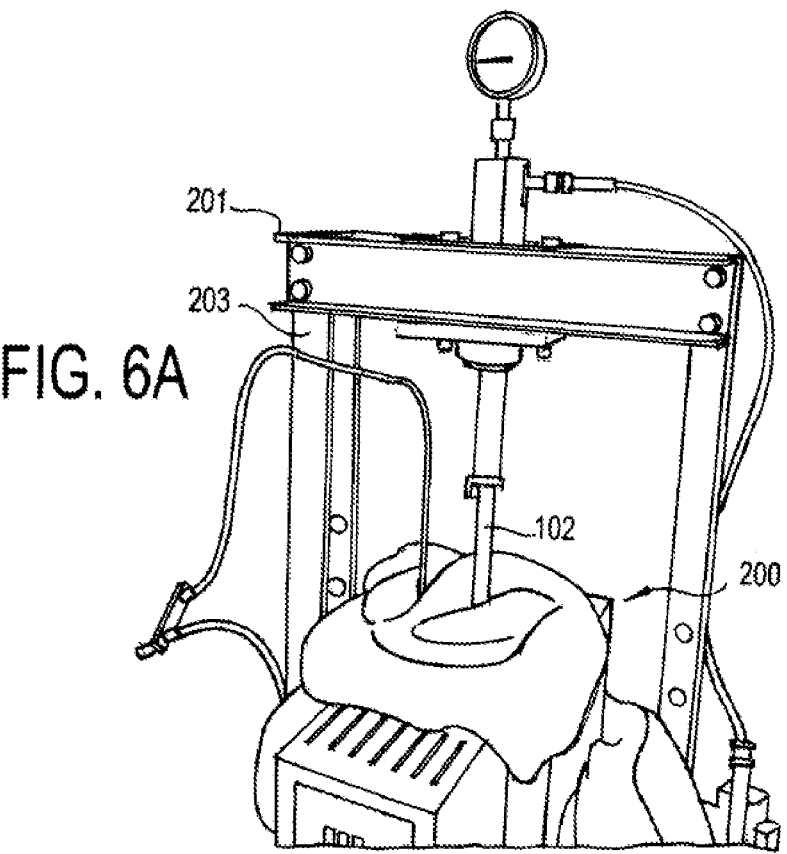
FIGS. 6A-6C show pressure being applied to extraction chamber for use in the processes described herein by mechanical, pneumatic or hydraulic pressure. The extraction unit is inside the kiln.
Figure 6B:
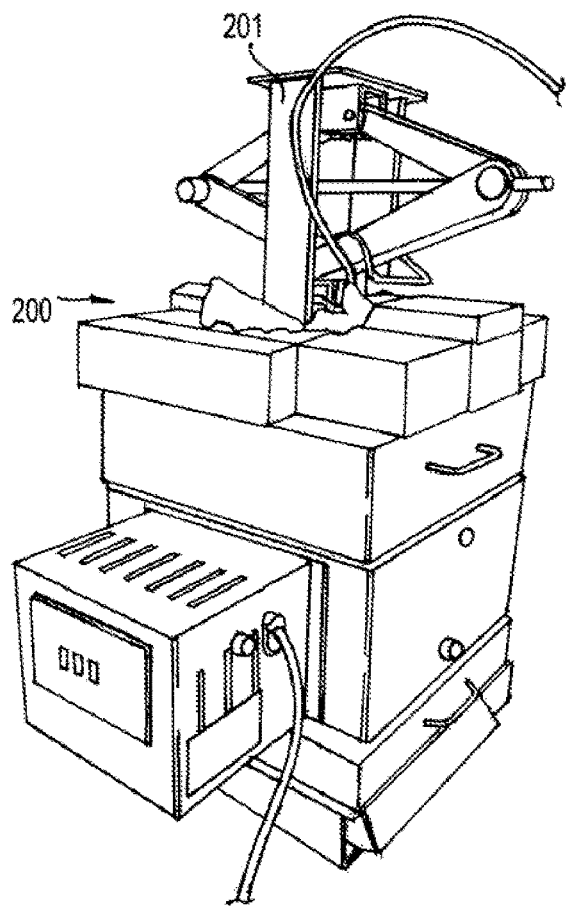
Figure 6C:
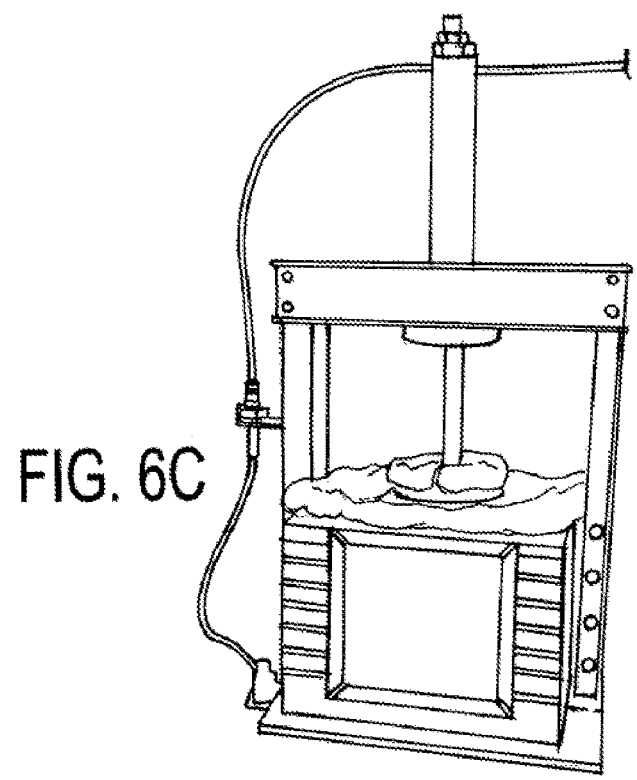

FIGS. 6A, 6B, 6C show the extraction chamber 200 having a vertical configuration. As noted above with respect to FIG. 3C, the extraction chamber 200 can be enclosed in a main housing 201 that forms a complete enclosure around the extraction chamber 200. FIGS. 6A, 6B, 6C show that the main housing 201 can be a frame 203 that extends over the extraction chamber 200. The frame 203 has two elongated vertical support members and a horizontal cross-member connecting the two vertical members. The vertical members can be fixed to the ground or to a horizontal base or platform 209. The extraction chamber 200 can be positioned on the base 209. As further shown in FIG. 6B, the extraction chamber 200 can be located within a kiln to control the temperature in the extraction chamber 200. FIGS. 6A, 6C show the compressor 102 having a threaded rod attached to the frame cross-member and a press plate, and FIG. 6B shows the compressor 102 having a scissor-type jack mechanism coupled to the cross-member of the frame 203. FIG. 6C also show round electrolyte from a product extraction unit.

FIGS. 7A-7H show yet another embodiment of the invention. Here, the extraction system 500 is shown. The system 500 includes an electrolysis and extraction chamber 502, transport assembly 520, housing, and a compressor and collection assembly 550. The electrolysis and extraction chamber 502 is a container having one or more vertical side walls 504, a bottom, and a top that is at least partially open. The container receives an anode electrode, a cathode electrode, and a liquid electrolyte that surrounds the anode and cathode. An opening 506 is provided along the at least one wall 504, at a position above the level of electrolyte in the chamber 502.

The housing at least partly encloses the electrolysis chamber 502. Here, the housing can be a frame having an elongated support frame member 530 extending horizontally over the electrolysis chamber 500. The support frame member can connect with other frame features, such as vertical support beams that are connected to a base, as in FIGS. 6A, 6B.

The transport assembly 520 is used to raise the cathode out of the electrolyte to remove the raw product, and then lower the cathode back into the electrolyte after the raw product is removed. That can be accomplished by any suitable mechanism(s), such as for example a motor, a gear or wheel, and a line. The motor and rotational wheel can be connected to the horizontal support frame 530. The line is coupled with the wheel and the cathode. The motor is operated to rotate the wheel, which in turn raises and lowers the cathode. The anode can also be separately connected to the transport assembly 520 by a separate line and wheel and have a separate or shared motor.

The compressor and collection assembly 550 has an extension rod 552, press plate 554, press wall 556, and collection device 560. The extraction assembly 550 is received in an opening 506 in the one or more side walls of the electrolysis chamber 500, and the entirety of the extraction assembly 550 is positioned above the electrolyte in the electrolysis chamber 500. The press plate 554 is positioned vertically inside the electrolysis chamber 500, and the rod 552 extends horizontally through the wall opening 506 to the exterior of the electrolysis chamber 500. The press wall 556 is a vertical plate or wall with a proximal end that is coupled to and extends downward from the horizontal support frame member 530. The wall 556 has a distal end that extends downward into the electrolysis chamber 500. In the embodiment shown, the distal end of the wall 556 stops above the electrolyte, so that the wall does not touch the electrolyte at the bottom portion of the electrolysis chamber 500. The press wall 556 can have other support members, such as horizontal beams that connect with the frame at the bottom end of the wall 556. The press wall 556 has two sides each with a respective opposite outwardly-facing surface. A first wall surface faces toward the compressor 550 and a second wall surface faces away from the compressor 550. The first wall surface is aligned with and faces an inward facing surface of the press plate 554. The rod 552 moves the press plate 554 horizontally forward and inward into the container 502 toward the press wall 556. Of course, other suitable means can be provided to move the press plate forward, such as a scissor-like jack positioned on the wall of the container 502.

The collection device 560 is situated at the bottom end of the press plate 554. As shown, the collection device 560 can be a shelf that extends horizontally outward from the bottommost edge of the press plate 560, substantially orthogonal to the inwardly facing surface of the press plate 560. The collection device 560 is sized to collect carbon (graphene) that is removed from the cathode. The collection device 560 can be received in a channel formed in the bottom end of the press plate 560, or attached to the bottom edge of the press plate 560. However, other suitable collection means can be provided, for example the collection device 560 need not be connected to the press plate 554, but instead can be connected to the at least one chamber wall 504 of the electrolysis chamber 502, and extend outward from the chamber wall 504 and inwardly toward the press wall 556.

Starting at FIG. 7E, operation of the extraction system 500 begins with the anode and electrode lowered by the transport mechanism 520 into the electrolyte inside the electrolysis and extraction chamber 502. The compression rod 552 is fully receded so that the press plate 554 is withdrawn and can be against the one or more walls 504. At that point, electrolysis begins. In FIG. 7F, gas is emitted from the reaction at the anode and product begins to accumulate on the cathode. In FIGS. 7G-7H, the reaction continues, and more and more paste product is formed on the cathode.

At FIG. 7H, the cathode is saturated with paste product. Accordingly, the motor of the transport assembly 520 is operated, and the cathode is lifted out of the electrolyte, FIG. 7A. At this point, the cathode and paste product are substantially aligned with, and parallel to, the first surface of the press wall 556 facing the press plate 554. The press wall 556 is positioned between the cathode and the anode. Accordingly, the paste product mostly accumulates on the side of the cathode that faces the press wall 556. Once the cathode is full raised, the press rod 552 is operated, moving the press plate 554 inwardly toward the press wall 556, as shown by the arrow. In FIG. 7B, the press plate 556 contacts the cathode, which in turn applies a compression force to the paste product, forcing the paste product down along the press wall 556 between the press wall 556 and the cathode.

The expelled product reaches the collection device 560. The collection device 560 can be a plate with openings or pores and can have a mesh screen or other filter mechanism situated on the porous plate. The distal end of the collection device 560 can contact the press wall 556 and/or extend under the press wall 556. The paste product expelled by the compression enters the collection device 560, which collects clean product (such as carbon or graphene), and allows clean electrolyte to pass through and return to the bottom of the electrolysis chamber 502. When pressed, electrolyte is pressed and separated from the paste through the supported screen. At FIG. 7C, the clean electrolyte has returned to the electrolysis chamber 502, and the clean product is in the collection device 560. At FIG. 7D, the press rod 552 is operated to withdraw the press plate 554 outward away from the press wall 556 and return to its initial position adjacent the chamber wall 504. The transport device then lowers the cathode back into the electrolyte for further electrolysis, and the clean product is removed from the collection device 560.

It is further noted that when the paste product is removed from the electrolyte, FIG. 7A, it will begin to cool and might solidify. A heat can be applied during the compression, FIG. 7B, to facilitate separation of the carbon and electrolyte. In addition, a scraper can be utilized to fully remove product from the press plate surface and the surface of the cathode, FIG. 7D. And as shown, the solid carbon/molten electrolyte mixed product is compressed directly on the cathode in the electrolysis chamber. In addition, it is also noted that some product may be present on both sides of the cathode, in which case product may also be directly compressed between the press plate and the cathode, and separated and collected.

Thus, as illustrated by the various embodiments, and as can be implemented by any of the embodiments unless specifically noted otherwise, the invention concerns applying a force to a nanoscopic product to macroscopically separate material. The invention is typically applied to a paste, and is especially useful for a paste product that forms at the cathode during an electrolysis reaction, and comprises a solid carbon nanomaterial product bound with some of the liquid electrolyte in which the reaction is performed (i.e., the paste is a solid carbon plus liquid electrolyte). When the paste is compressed, the bound liquid electrolyte is separated from the solid desired carbon nanomaterial product. The electrolyte is not diluted, destroyed or otherwise rendered unusable as a result of the separation process. Accordingly, the electrolyte can be recycled (e.g., returned to the electrolysis chamber) or discarded, and the solid carbon product remains. These electrolysis reactions are performed in molten electrolytes at 700+ degrees C. The compression can be performed in the electrolysis chamber or outside the electrolysis chamber, and can be done while the paste is on the cathode or after it is removed from the cathode. If the compression/separation process is performed in a separate extraction chamber (i.e., not in the electrolysis chamber in which the reaction was carried out) the product can be cooled below the melting point of the electrolyte to form a solid carbon/solid electrolyte product that can be removed from the cathode, placed in the separate extraction chamber, then heated to re-melt the electrolyte so the liquid electrolyte can be removed from the desired solid carbon product in that separate chamber.

Though a compression force is illustrated, other suitable forces can be applied, such as a torque, centripetal force, twisting, or rotational force. And, while the invention is illustrated for use with a paste product to separate electrolyte and carbon product, the system can be utilized for separating other suitable materials. In addition, the system utilized to apply the force to a product can be any suitable configuration, and the systems shown in the figures are only for illustrative purposes and do not limit the invention. For example, the figures illustrate that any number of containers or chambers can be utilized. In FIG. 7, a single chamber can be utilized for electrolysis, compression and separation. In FIG. 4, a chamber is provided for compression and separation that is separate from the chamber where electrolysis occurs. In FIG. 1, three chambers can be utilized for compression and separation, and in FIG. 2 two chambers can be utilized. The chambers can be arranged horizontally or vertically, and can have any suitable shape, such as for example rectangular, square and circular. The force can be imparted by any suitable apparatus, such as a press plate and rod or hydraulic mechanism, pneumatically or manually. In addition, the type and manner of application of force can be varied, such as for example a compression force can be applied, removed, and then applied again (and repeated), or a compression force can be applied, followed by a difference force, such as torque. Still further, the compression can be applied while the product is on the cathode, or after the product is removed from the cathode.

It is noted that high temperature presses might be thought to expose and oxidize (combust) the carbon product. However, the inventors recognized that the electrolyte itself protects the product from combustion during the pressing process. In addition, nanomaterials are too small to be separated by presses since the presses intrinsically depend on greater than micron or greater than millimeter filters, and therefore the nanomaterials are too small to be separated by the filters. However, the inventors recognized that the agglomeration and aggregation of the carbon nanotube product during electrolysis allows for filtering of nanomaterials with larger filters, such as micron and millimeter sized filters. That is, the individual carbon nanomaterial product has nanoscopic dimensions, but the carbon agglomerates, and the agglomerated product has micron and millimeter dimensions.

In another embodiment of any of the processes described herein, the electrolyte is removed through an interface with pores 108. In one embodiment, the interface with pores 108 comprises a foam, such as, for example, a porous carbon felt, a graphite felt, a metal mesh, a porous or sieve ceramic, or any combination thereof. In one embodiment, the pore size of the interface with pores is between about 10 µm and about 10 mm, such as between about 0.1 mm and about 5 mm or between about 0.3 mm and about 3 mm. In a further embodiment, any of the processes described herein further comprises applying a vacuum, such as vacuum 220, during the separation/extraction process, for example, to enhance removal of the electrolyte and separation of the solid carbon product In another embodiment, an oxygen excluding gas (e.g., a gas that is free or substantially free of oxygen), such as, for example, nitrogen, carbon dioxide, argon, or a reducing gas, such as, for example, methane, ammonia, hydrogen and hydrogen sulfide, and any combination of any of the foregoing, is used to blanket the carbon product during the separation, for example, to minimize any loss by oxidation of the carbon product during exposure to oxygen at elevated temperatures.

In other embodiments of any of the processes described herein, the molten electrolyte cathode product mix is compressed directly on the cathode in the electrolysis chamber.

In another embodiment of any of the processes described herein, the electrolyte cathode product mix is removed from the cathode in the electrolysis chamber, e.g. without pumping, into a separate extraction compression chamber prior to separation of the solid product.

In further embodiments of any of the processes described herein, the mixed product is separated without cooling from the molten stage, for example, for reinclusion in the electrolysis without loss of heat. In further embodiments of any of the processes described herein, the mixed product is cooled, and the cooled congealed product is reheated above the electrolyte melting point prior to compression (separation). In either case, the molten mix may be compressed through the application of pressure and pressed through the interface 108 with pores smaller than the carbon matrix size. The macroscopic (greater than micron) pore size is larger than the nm dimensions of nanomaterials in the carbon product, but smaller than the carbon matrix size. Product compression draws electrolyte out of the product while solid carbon is restrained by the pores and retained in the product.

EXAMPLES

Example 1: Extraction Using Vacuum

Figure 2A:
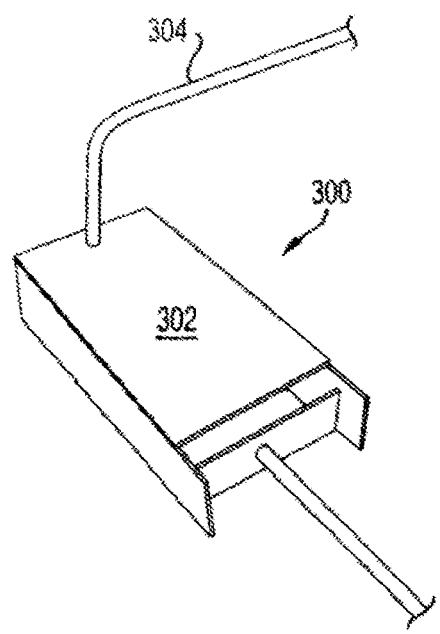
FIGS. 2A-2E show various shapes of suitable extraction chambers for use in the processes described herein.
Figure 2B:
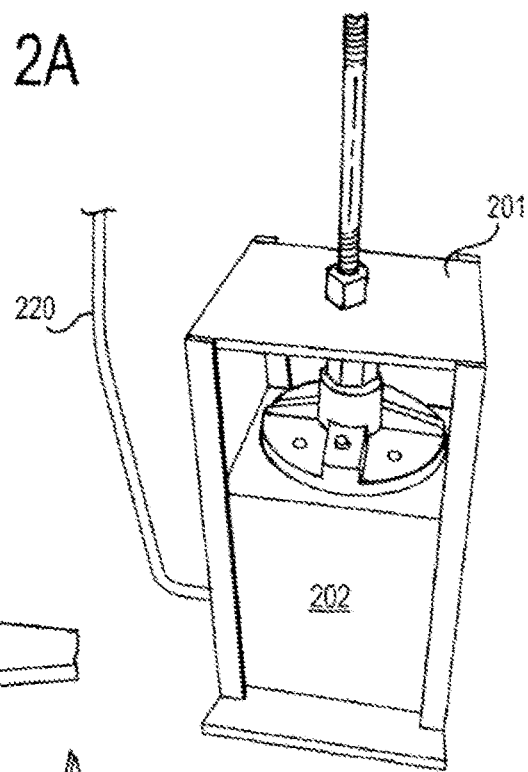
Figure 2C:
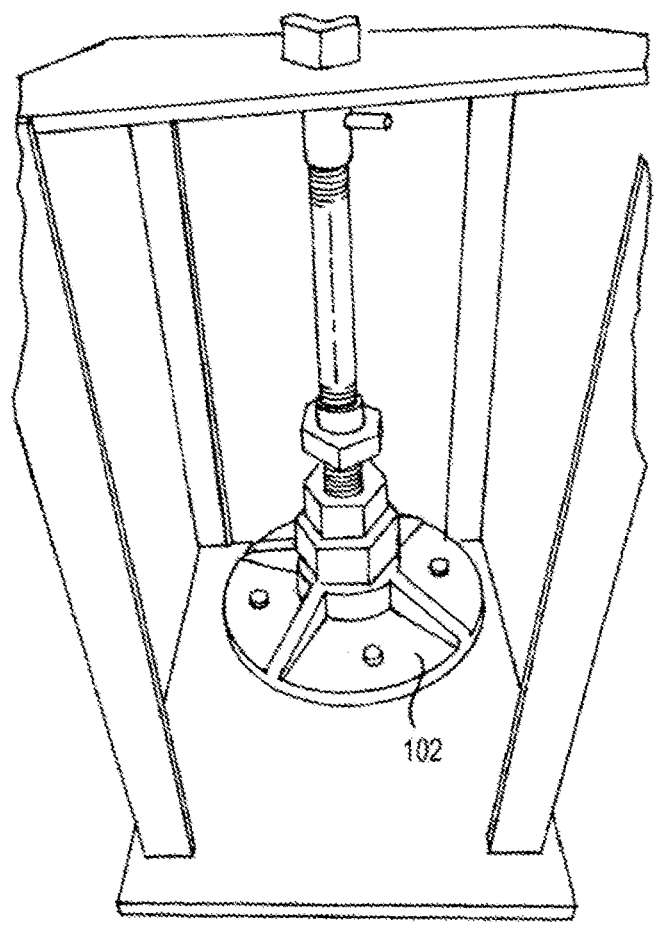
Figure 2D:
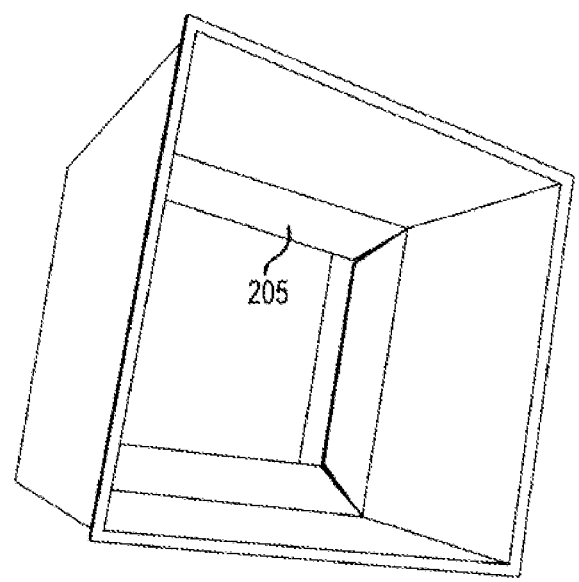
Figure 2E:
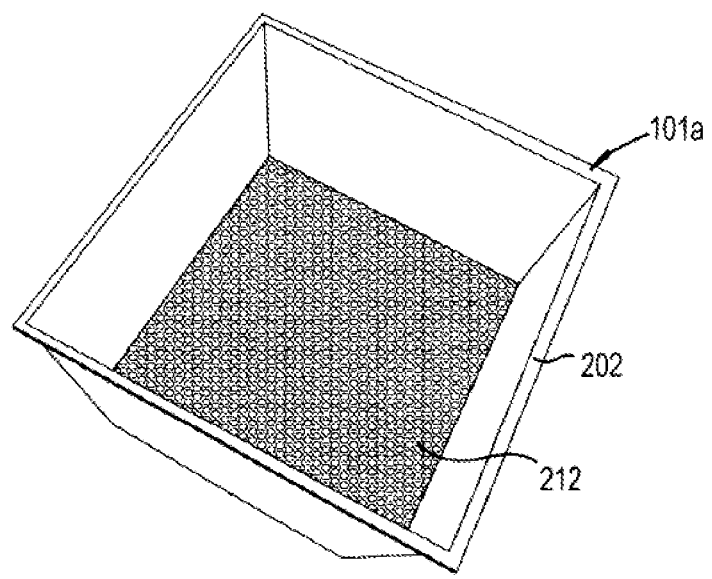

A solid carbon/molten electrolyte mixed product (carbonogel), removed from the cathode of a brass cathode and formed on the cathode by electrolysis in a molten alkali carbonate electrolyte at 750° C. at an applied current density of 0.1 A cm$^{-2}$ between an Inconel anode and the brass cathode for 4 hours, was separated into carbon nanotubes and clear electrolyte using the product extractor 300 shown in FIG. 2A. Carbon felt was placed on a ⅛" honeycomb structured steel plate that acts as a support during the subsequent pressing stage. On top of the carbon felt, respective layers of 200×200, 100×100 and finally 50×50 Monel mesh were placed. Carbon dioxide flowed into the top of the extractor to prevent oxidation of the carbonogel and subsequent separated carbon product. 50 g of carbonogel product grown by electrolysis in a pure lithium carbonate electrolyte, and previously analyzed as containing 6% carbon nanomaterials and 94% electrolyte (comprising of 3 g of carbon and 47 g of electrolyte) was removed from the cathode and placed at 770° C. on top of the uppermost (50 mesh) Monel layer. Above the carbonogel was placed subsequent layers of 40×40 Inconel mesh and 200×200 Monel mesh. The press plate shown on the left side of FIG. 2A was placed on top of the uppermost mesh layer and a pressure of 0.5 tonnes was applied for 1.5 hours. A vacuum 304 of 0.08 MPa was applied through the metal tube shown on the left side of FIG. 2A. The vacuum was applied in the electrolyte collection chamber at the bottom of the extractor. Finally, the extractor was cooled, the press plate removed, the carbon product retained, and the clear extracted electrolyte removed and weighed. 87.0% of the electrolyte in the carbonogel was removed and recovered by this procedure.

Example 2: Extraction without Using Vacuum

A solid carbon/molten electrolyte mixed product (carbonogel), removed from the cathode of a brass cathode and formed on the cathode by electrolysis in a molten alkali carbonate electrolyte at 750° C. at an applied current density of 0.1 A cm$^{-2}$ between an Inconel anode and the brass cathode for 4 hours, was separated into carbon nanotubes and clear electrolyte using the product extractor shown on the middle and right sides of FIG. 2A. No carbon felt was used. Use of a larger press minimized leakage at the press plate edges, and decreased the press time, both improving extraction efficiency even in the absence of a vacuum draw.

On the honeycomb structured steel support plate was placed respective layers of (1) 40×40 Inconel mesh, (2 and 3) two layers of 200×200 Monel mesh, and finally (4) another 40×40 Inconel mesh. Carbon dioxide flowed into the top of the extractor to prevent oxidation of the carbonogel and subsequent separated carbon product. 200 g of carbonogel product grown by electrolysis in a 20 wt. % sodium carbonate and 80 wt. % lithium carbonate electrolyte, and previously analyzed as containing 6% carbon nanomaterials and 94% electrolyte (comprising of 3 g of carbon and 47 g of electrolyte), was removed from the cathode and placed at 770° C. on top of the uppermost mesh layer. Above the carbonogel was placed subsequent layers of 40×40 Inconel mesh and 200×200 Monel mesh. The press plate was placed on top of the uppermost mesh layer and a pressure of 5 tons was applied for 0.5 hours. A vacuum of 0.08 MPa was applied through the metal tube shown on the left side of FIG. 2A. The vacuum draw was applied in the electrolyte collection chamber at the bottom of the extractor. Finally, the extractor was cooled, the press plate removed, the carbon product retained and the clear extracted electrolyte removed and weighed. 93.9% of the electrolyte in the carbonogel was removed and recovered by this procedure.

It is further noted that the description and claims use several geometric or relational terms, such as planar, elongated, circular, parallel, perpendicular, orthogonal, transverse, longitudinal, and flat. In addition, the description and claims use several directional or positioning terms and the like, such as horizontal, vertical, top, bottom, left, right, up, down, distal, and proximal. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, walls may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention.

The following documents are incorporated herein by reference.

(1) Ren et al., One-pot synthesis of carbon nanofibers from $CO_2$, *Nano. Lett.*, 15, 6142-6148 (2015); (2) Johnson et al., Carbon nanotube wools made directly from $CO_2$ by molten electrolysis: Value driven pathways to carbon dioxide greenhouse gas mitigation, *Materials Today Energy*, 5, 230-236 (2017); (3) Ren et al., Tracking airborne $CO_2$ mitigation and low-cost transformation into valuable carbon Nanotubes, *Scientific Reports, Nature*, 6, 27760 1-10 (2016); (4) Wu et al., One-pot synthesis of nanostructured carbon material from carbon dioxide via electrolysis in molten carbonate salts, *Carbon*, 106, 208-217 (2016); (5) Wang et al., Exploration of alkali cation variation on the synthesis of carbon nanotubes by electrolysis of $CO_2$ in molten carbonates, *J. $CO_2$ Utilization*, 34, 303-312 (2019); (6) Liu et al., Carbon Nano-Onions Made Directly from $CO_2$ by Molten Electrolysis for Greenhouse Gas Mitigation, *Advanced Sustainable Systems*, 1900056, 1-10 (2019); (7) Yu et al., Strength and Breaking Mechanism of Multiwalled Carbon Nanotubes Under Tensile Load, *Science*. 287, 637-640 (2000); (8) Chang et al., A New Lower Limit for the Ultimate Breaking Strain of Carbon Nanotubes, *ACS Nano*, 4, 5095-5100 (2010); (9) Gui et al., Carbon nanotube sponges, *Advanced Materials*, 22, 617-621 (2010); (10) Wu et al., Carbon nanofiber aerogels for emergent cleanup of oil spillage and chemical leakage under harsh conditions, *Scientific Reports*, 4, 4079 1-6 (2014); (11) Kim et al., Graphene-Coated Carbon Nanotube Aerogels Remain Superelastic while Resisting Fatigue and Creep over −100 to +500° C., *Chemistry of Materials*, 4, 2748-2755 (2017).

The foregoing description and drawings should be considered as illustrative only of the principles of the invention.

The invention may be configured in a variety of shapes and sizes and is not intended to be limited by the embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A system comprising:
  an electrolysis chamber;
  a force applicator configured to press a mixed product including a solid carbon and a molten electrolyte, wherein the force applicator is configured to compress the mixed product in the electrolysis chamber; and
  a filter configured to isolate the solid carbon from the electrolyte.

2. The system of claim 1, wherein the filter is configured to be positioned below the mixed product.

3. The system of claim 1, wherein the filter is configured to be positioned to the side of the mixed product.

4. The system of claim 1, wherein the filter is configured to be positioned above the mixed product.

5. The system of claim 1, wherein the filter is configured to be positioned to the backside of the mixed product.

6. The system of claim 1, wherein the force applicator is configured to apply and remove the pressing force repeatedly.

7. The system of claim 1, wherein said filter comprises an interface with pores, said interface configured to remove the electrolyte from said solid carbon.

8. The system of claim 7, further comprising a vacuum configured to remove the electrolyte from said solid carbon.

9. The system of claim 1, wherein the system is under a gas that is free or substantially free of oxygen.

10. The system of claim 9, wherein the gas is selected from nitrogen, carbon dioxide, argon, methane, ammonia, hydrogen, hydrogen sulfide, and any combination thereof.

11. The system of claim 1, wherein the mixed product is cooled after formation by electrolysis, and further comprising a heater configured to reheat the mixed product prior to the force applicator pressing the mixed product.

12. The system of claim 1, further comprising:
  a cathode configured to be positioned in the electrolysis chamber; and
  an extraction chamber,
  wherein the mixed product is configured to be moved from the cathode to the extraction chamber prior to said force applicator pressing the mixed product.

13. The system of claim 1, wherein the electrolyte is not a flowing electrolyte.

14. The system of claim 1, wherein the system does not include a recirculation loop that recirculates the electrolyte.

15. The system of claim 1, wherein the solid carbon has an average thickness greater than 1 millimeter.

16. The system of claim 1, wherein the solid carbon comprises greater than about 80% carbon nano-materials.

17. The system of claim 1, wherein the solid carbon comprises nano-fibers, nano-tubes, nano-onions, nano-platelets, or nano-scaffolds.

18. The system of claim 1, wherein the solid carbon comprises graphene nano-materials.

19. The system of claim 1, wherein the solid carbon is formed from raw carbon nano-material that agglomerates during a carbonate electrolysis, and said filter has pores larger than the raw carbon nano-material.

20. The system of claim 1, wherein the solid carbon comprises a paste.

21. The system of claim 1, further comprising an electrolysis chamber collecting electrolyte that passes through the filter.

22. The system of claim 1, wherein the filter is configured to be positioned either below, above, to the side, above, or the backside of the mixed product, or a combination thereof.

23. The system of claim 1, wherein the force applicator is configured to press the mixed product by applying a compression force, torque, a rotational force, a twisting force or any combination thereof.

* * * * *